D. H. TWAITS.
SELF LUBRICATING SPRING BOLT.
APPLICATION FILED DEC. 22, 1913.
1,154,947. Patented Sept. 28, 1915.
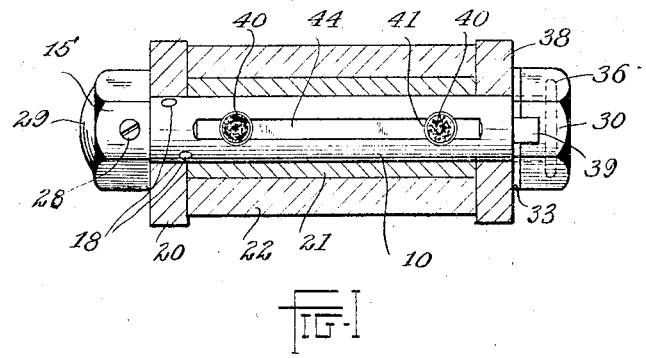
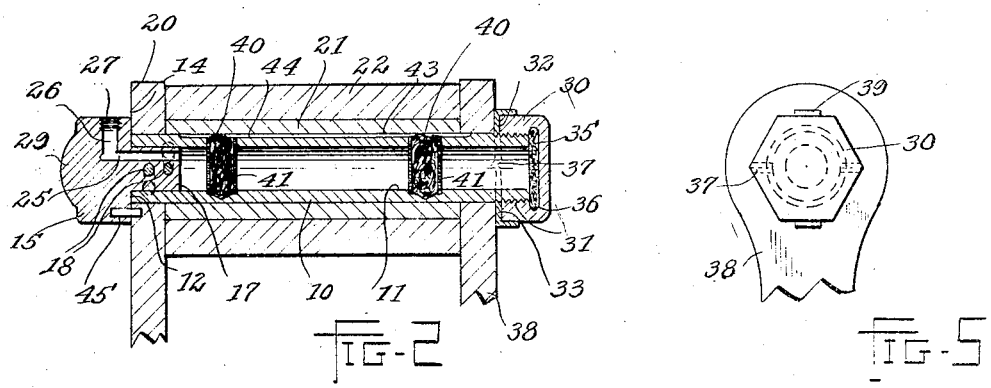
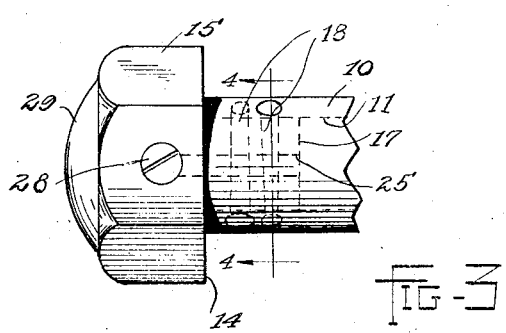 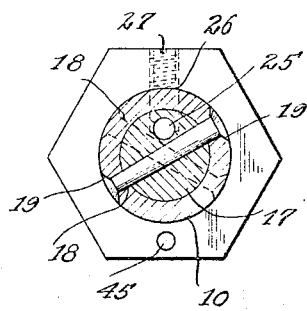
Witnesses
Inventor
Daniel H. Twaits,
By Albert H. Bates,
Atty.

UNITED STATES PATENT OFFICE.

DANIEL H. TWAITS, OF CHICAGO, ILLINOIS.

SELF-LUBRICATING SPRING-BOLT.

1,154,947.  Specification of Letters Patent.  Patented Sept. 28, 1915.

Application filed December 22, 1913. Serial No. 808,163.

*To all whom it may concern:*

Be it known that I, DANIEL H. TWAITS, a citizen of the United States, residing at Chicago, in the county of Cook and State of Illinois, have invented a certain new and useful Improvement in Self-Lubricating Spring-Bolts, of which the following is a full, clear, and exact description, reference being had to the accompanying drawings.

This invention relates to lubricating spring bolts of a type wherein there is a reservoir for the lubricant within the bolt, and its general object is to provide a very simple, durable spring bolt which may be cheaply manufactured.

A more specific object is to provide a plug for closing one end of a tubular member, forming the shank of the bolt, which may be rigidly secured therein, and which has integral therewith an enlarged angular portion forming the head of the bolt.

To the above ends, the invention consists in a combination of parts hereinafter described and summarized in the claims.

In the drawings, Figure 1 is a plan of the bolt showing the same in position extending through the eye and shackles of a suitable spring; Fig. 2 is a longitudinal section of the bolt also showing the eye and shackles of the spring; Fig. 3 is an enlarged detail view of the head of the bolt; Fig. 4 is a cross section of the same taken on the line 4—4 of Fig. 3; Fig. 5 is an end elevation of the opposite end of the bolt.

Referring to the parts by numerals: 10 is a tubular member forming the shank of the bolt, the interior bore 11 of which when closed at the ends, forms a reservoir for the lubricant. This bore 11 may be of the same diameter throughout the full length, which greatly facilitates the manufacturing of this member. At the head end, the tubular member is squared off, as at 12, to fit the shoulder 14 of the angular head 15. This angular head has a reduced portion 17 integral therewith and having a cylindrical exterior tightly fitting into the end of the bore 11.

When forced into place, the shank 17 is rigidly secured to the member 10 by pins 18 extending through this member and through the shank 17, and having their ends upset into suitable chamfered portions 19. There are preferably two of these pins, adjacent and crossed, as shown in Fig. 4. The upset ends are smoothed off to conform to the exterior surface of the member 10, which allows this member to be passed through the shackle 20 and into the usual bushing 21 mounted in the eye 22 of one of the spring members.

The crossing of the pins 18 secures the shank 17 to the member 10 at points evenly distributed about the circumference of the bolt, and at the same time leaves room in this shank for a longitudinal passage 25 which communicates at its inner end with a transverse passage 26, and through which lubricant may be supplied to the interior of the member 10. The upper portion of this passage 26 is preferably threaded as at 27, and is normally closed by a suitable headless screw 28, which prevents leakage of the lubricant and at the same time does not allow grit and dirt to get into the interior of the bolt.

As it will be seen, I have very tightly closed this end of the tubular member and at the same time have provided a simple and rigid head for the bolt. This head is securely held against being pulled out of the tubular member when the bolt is drawn tightly into place, and a wrench may be used on the angular portion of the head without any danger of turning the head with relation to the tubular portion. The head of the bolt may be of any desired shape, but it is preferably angular as shown, and for the sake of appearance, is provided with a dome portion 29, which may be formed on the head in the process of making.

The opposite end of the bolt may be closed by an internally threaded cap 30 engaging threads 31 on the exterior of the tubular member. The exterior of this cap is preferably angular and when screwed in place, a squared off portion 32 engages a washer 33 to draw the bolt into place, the cap thereby acting as the nut for the bolt. The leakage of the lubricant is prevented at this end of the bolt, by a resilient packing 35 which is carried in an undercut seat 36 formed at the inner end of the threads of the cap. The washer 33 is preferably a suitable lock washer and as shown, is provided with projecting portions 37 engaging suitable notches in the sides of the shackle 38 and has ears 39 which are turned up to engage the flattened sides of the cap 30 after being screwed into place, thereby preventing it from inadvertently turning.

Any suitable means may be provided for feeding the lubricant from the interior of the bolt to the bearing surfaces. As shown, I have provided wick members 40 mounted in porous metallic tubes 41 which extend through suitable openings in the sides of the tubular member. The lubricant travels by capillary action in the wicks 40 from the interior of the bolt, to the bearing surface 43. The bolt is flattened off at 44 to provide a passage insuring the lubricant coming in contact with the bearing surface for the full length thereof.

Any suitable means may be provided for holding the bolt with the wicks in the upright position and the passage 26 at the top side of the bolt head. As shown, I have provided a pin 45 carried by the head and engaging a suitable depression in the shackle 20.

It will be seen from the foregoing description that I have provided a bolt which may be very cheaply manufactured.

The tubular member 10 may be merely a short length of hollow tubing or may be readily formed from a solid piece by boring out the interior, while the head portion may be very readily formed from a solid bar, by processes well known in the art, and when formed, rigidly secured to the tubular member, by the pins, as described. The cap portion at the other end as well as the above mentioned parts, may be conveniently made from materials easily obtainable.

Having thus described my invention, what I claim is:

1. In a spring bolt, the combination of a tubular member forming the shank of the bolt, a head having a portion integral therewith and extending into the tubular member and closing the end of the same, means extending through the wall of the tubular member and engaging said portion of the head within the tubular member, and lubricating passages leading into and from the interior of the bolt.

2. In a spring bolt, the combination of a tubular member forming the shank of the bolt and having a cylindrical bore, a head having a cylindrical male portion extending into the end of the tubular member and tightly fitting the same, a pin extending through the wall of the tubular member and into the male portion of the head, a removable closure for the other end of the bore, and lubricant outlet means for the bolt.

3. In a spring bolt, the combination of a tubular member forming the shank of the bolt, a head having a male portion integral therewith, an enlarged angular portion, said male portion adapted to enter the end of the tubular portion, and a pin extending through the end of the tubular portion and said male portion, said tubular member having an opening for admitting lubricant and lubricant outlet means.

4. In a spring bolt, the combination of a tubular member having a cylindrical bore and an open end, said open end being squared off at right angles to the axis of the member, an angular head having a male portion and a shoulder squared off at right angles thereto, the male portion adapted to enter the inner end of the tubular portion, said shoulder adapted to abut the squared off end of the tubular portion, and a pin extending through the tubular portion and through the male portion, said tubular member having an opening for admitting lubricant and lubricant outlet means.

5. In a spring bolt, the combination of a tubular member, an angular head having a male portion adapted to enter and close the end of the tubular member, and two pins passing through the end of the tubular member and through said male portion, said pins being adjacent and at an angle with each other, said tubular member having an opening for admitting lubricant and lubricant outlet means.

6. In a spring bolt, the combination of a tubular member, a plug fitting into one end thereof, a pin extending through the end of the tubular member and said plug, and a passage extending through said plug into the interior of the tubular member, said passage being so arranged as to extend past said pin at one side thereof, said tubular member having lubricant outlet means.

7. In a spring bolt, the combination of a tubular member, a plug fitting into one end thereof, two pins extending through the end of the tubular member and said plug and said pins being adjacent and at an angle with each other, and a longitudinal passage extending through said plug into the interior of the tubular member, said passage being so positioned as to extend past said pins and between the sides of the angles formed by the pins, said tubular member having lubricant outlet means.

8. In a spring bolt, the combination of a tubular member externally threaded at one end and having a bore extending throughout the length thereof, a cap screwed onto said exterior threads and closing one end thereof, a head having an enlarged angular portion and a reduced male portion tightly fitting one end of said bore, a pin extending through said tubular member and through said male portion, and a passage in said head leading to the interior of the tubular member, said tubular member having lubricant outlet means.

9. In a spring bolt, the combination of a tubular member open at each end, a head having an angular portion and a reduced portion fitting the inside of said tubular member and closing one end thereof, a pin extending through said tubular member and through said male portion, a longitudinal passage in said male portion extending into said head, a radial passage in said head communicating with the longitudinal passage, and a plug threaded into said radial passage, said tubular member having lubricant outlet means.

10. In a spring bolt, the combination of a tubular member, a plug fitted into one end thereof and having an angular head, means for securing the plug in the end of the tubular member whereby it forms the bolt head, a passage through the bolt head to the interior of the tubular member, lubricating outlet means for the tubular member, the end of the tubular member opposite the head being threaded, and a threaded cap closing that end of the tubular member and forming the nut of the bolt.

11. In a spring bolt, the combination of a tubular member, an angular head having a portion extending into one end of the tubular member, means for securing it thereto, a passage through the head leading to the interior of the tubular member, said tubular member having lubricating outlet means, and a cap threaded onto the other end of the tubular member closing the same and forming the nut for the bolt.

In testimony whereof, I hereunto affix my signature in the presence of two witnesses.

DANIEL H. TWAITS.

Witnesses:
  HENRIETTA A. O'DAY,
  CARRIE E. GOLTRA.